United States Patent
Desjeux et al.

(10) Patent No.: US 7,142,815 B2
(45) Date of Patent: Nov. 28, 2006

(54) ADJUSTMENT OF THE DETECTION, TRANSMISSION AND/OR RECEPTION PARAMETERS OF AN RFID READER AS A FUNCTION OF AMBIENT ELECTROMAGNETIC NOISE

(75) Inventors: Olivier Desjeux, Le Landeron (CH); Laurent Neveux, Monaco (MC); Saak Dertadian, Nice (FR)

(73) Assignee: EM Microelectronics-Marin SA, Marin (CH)

(*) Notice: Subject to any disclaimer, the term of this patent is extended or adjusted under 35 U.S.C. 154(b) by 577 days.

(21) Appl. No.: 10/648,792

(22) Filed: Aug. 27, 2003

(65) Prior Publication Data
US 2004/0137844 A1    Jul. 15, 2004

(30) Foreign Application Priority Data
Sep. 2, 2002    (EP)    ................................. 02078606

(51) Int. Cl.
*H04B 7/00*    (2006.01)
(52) U.S. Cl. .................. 455/41.2; 455/82; 455/121; 340/10.1; 340/572.7
(58) Field of Classification Search .............. 455/41.1, 455/41.2, 41.3, 82, 121; 340/10.1, 572.7
See application file for complete search history.

(56) References Cited

U.S. PATENT DOCUMENTS 5,134,720 A    7/1992    Gamgee et al.
6,509,837 B1 *    1/2003    Tuttle et al. ............. 340/572.7
6,574,454 B1 *    6/2003    Tuttle ......................... 455/41.1
6,781,508 B1 *    8/2004    Tuttle et al. ............... 340/10.1

FOREIGN PATENT DOCUMENTS

| DE | 198 47 135 A1 | 4/2000 |
| WO | WO 01 15070 A1 | 3/2001 |
| WO | WO 02 41029 A1 | 5/2002 |

* cited by examiner

*Primary Examiner*—Matthew D. Anderson
*Assistant Examiner*—Sanh Phu
(74) *Attorney, Agent, or Firm*—Sughrue Mion, PLLC

(57) ABSTRACT

There is described a method for adjusting the detection, transmission and/or reception parameters (DET, $G_{Tx}$, $G_{Rx}$) of a radiofrequency reader (10) of an electronic radiofrequency identification system as a function of the ambient electromagnetic noise. This method includes at least one step of measuring, via the radiofrequency reader, the ambient electromagnetic noise level, and a step of adjusting the detection, transmission and/or reception parameters of the radiofrequency reader on the basis of the measured ambient electromagnetic noise level. Preferably, this method further includes a step of measuring the response of a reference transponder (30) placed at least temporarily in the interrogation field of the antenna (20) associated with the radiofrequency reader, this reference transponder (30) having similar characteristics to the characteristics of the transponders to be identified. The adjustment step also includes adjustment of the detection, transmission and/or reception parameters of the radiofrequency reader on the basis of the measured response of the reference transponder (30). There is also described an electronic radiofrequency identification system for implementing this method.

8 Claims, 3 Drawing Sheets

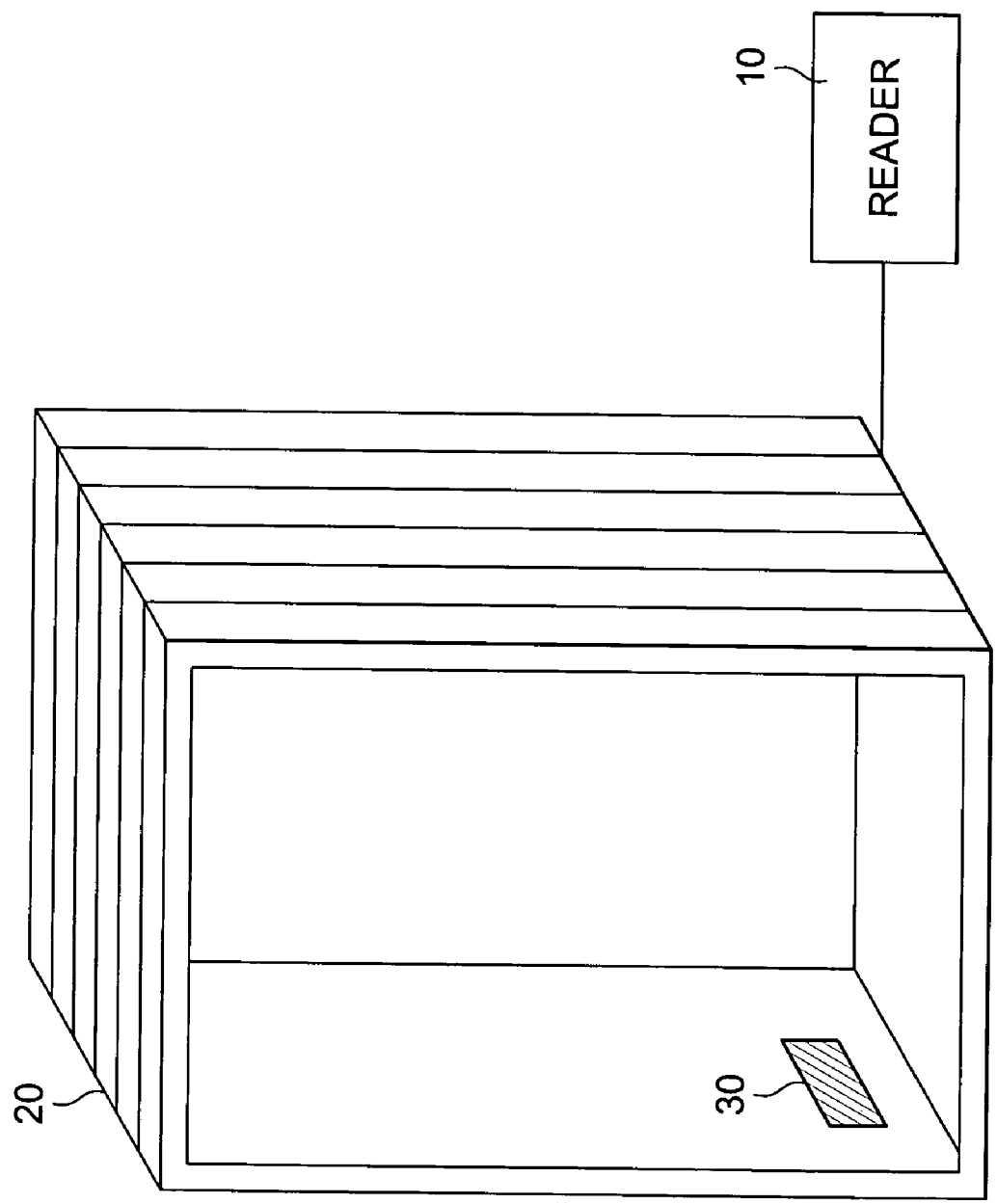

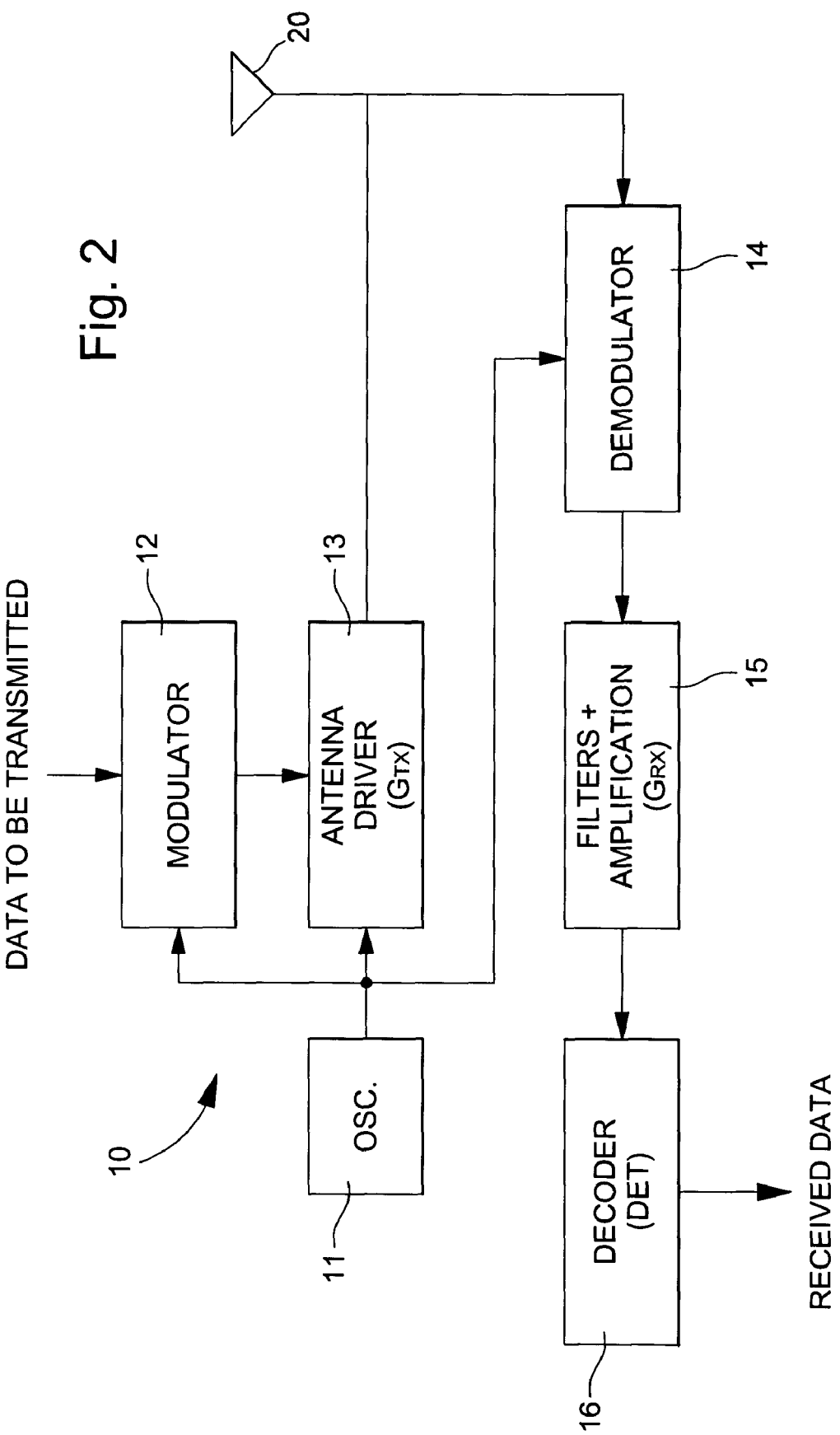

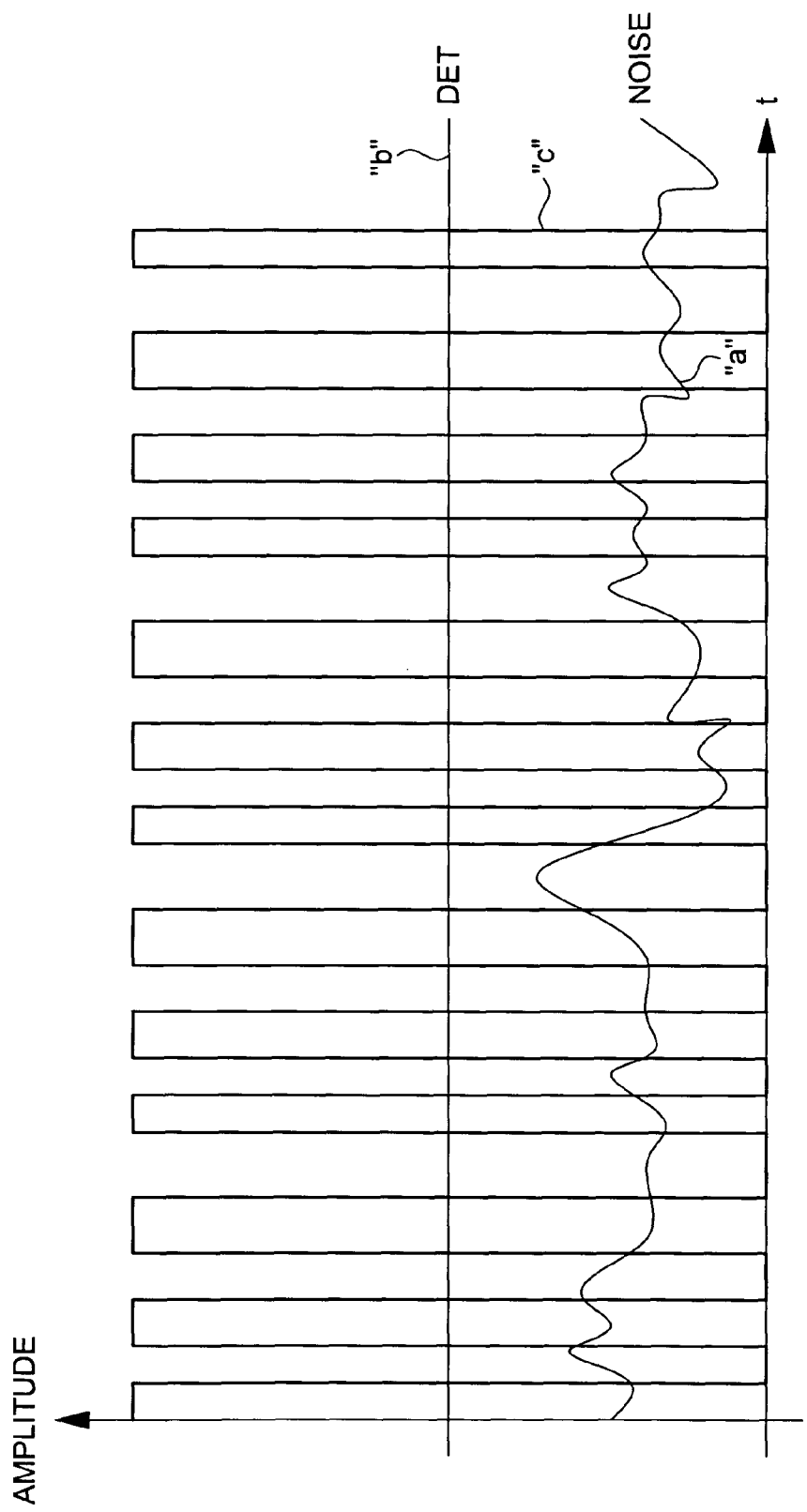

ADJUSTMENT OF THE DETECTION, TRANSMISSION AND/OR RECEPTION PARAMETERS OF AN RFID READER AS A FUNCTION OF AMBIENT ELECTROMAGNETIC NOISE

The present invention relates generally to an electronic radiofrequency identification system (or RFID system) including at least one radiofrequency reader and an antenna associated with the radiofrequency reader for generating an interrogation field through which transponders to be identified pass. The present invention relates more particularly to a method for adjusting the detection, transmission and/or reception parameters of the radiofrequency reader of such a system as a function of ambient electromagnetic noise.

In the context of industrial logistics, RFID readers are provided with antennae of very large dimensions, which give the system a very high level of sensitivity, which is necessary to obtain the performances required for this type of application. The industrial logistics context is characterised, on the one hand, by ambient electromagnetic noise often with variable amplitude and distribution and, on the other hand, by a multiplicity of readers close to each other. These two characteristics mean that each reader has to transmit with the lowest possible field amplitude so as to interfere as little as possible with the other readers but also with a sufficient high amplitude level to get rid of the ambient electromagnetic noise. It will also be noted that the signal-noise ratio in this environment is variable as a function of the external disrupting activity (motors, neons, switch operations, etc.) and as a function of the activity of the nearby readers.

It will be understood that a reader permanently set to respond to the aforementioned contradictory conditions will not constitute an optimum solution, since, given the variable nature of the ambient electromagnetic noise, this reader will be either to sensitive to ambient electromagnetic noise, or too disruptive for the other nearby readers. A solution is thus necessary to optimise the detection, transmission and/or reception characteristics of the system at all time. It is an object of the present invention to propose such a solution.

The present invention thus concerns a method for adjusting the detection, transmission and/or reception parameters of a radiofrequency reader of an electronic radiofrequency identification system whose features are stated in claim 1.

The present invention also concerns an electronic identification system for implementing this method.

Advantageous embodiments of the invention form the subject of the dependent claims.

According to the invention, there is therefore proposed a method for adjusting the detection, transmission and/or reception parameters (or setting parameters) of a radiofrequency reader as a function of the ambient electromagnetic noise, whose essential feature lies in the fact that it includes at least one step of measuring, by means of the radiofrequency reader, the level of ambient electromagnetic noise, and a step of adjusting the detection, transmission and/or reception parameters of the radiofrequency reader on the basis of the measured ambient electromagnetic noise level.

Preferably, in order to obtain a system that operates in an optimum manner, there is provided an additional measuring step that consists of the measure by the radiofrequency reader of the response of a reference transponder placed, at least temporarily, (i.e. permanently or each time an adjustment to the parameters of the reader is necessary) in the interrogation field of the antenna associated with the radiofrequency reader, this reference transponder having similar characteristics to the characteristics of the transponders that the system has to identify. The adjustment step is then also carried out on the basis of the measured response of the reference transponder.

More particularly, the step of measuring ambient electromagnetic noise allows setting of the sensitivity of the reader to this noise. This is preferably and advantageously achieved via an adjustment of the reader's modulation detection threshold, i.e. a threshold allowing detection of the modulation transmitted by the transponder in the guise of a response. This step of measuring ambient electromagnetic noise also allows, where appropriate, to prevent the reader from operating, to display an error message or to be subsequently restart operation in the event that the level of ambient electromagnetic noise is too high.

The additional step of measuring the response of the reference transponder allows, where appropriate to set, the transmission and reception gains of the radiofrequency reader such that the signal-to-noise ratio is optimised at the moment of reading or writing into the transponder.

Other features and advantages of the present invention will appear more clearly upon reading the following detailed description, made with reference to the annexed drawings, given by way of non-limiting example and in which:

FIG. 1 is a schematic diagram of an electronic radiofrequency identification system comprising in particular a radiofrequency reader and an associated antenna;

FIG. 2 is a schematic diagram of the architecture of the radiofrequency reader of FIG. 1 showing the main operating elements thereof; and FIG. 3 is a diagram of development over time, illustrating a representative example of the ambient electromagnetic noise and a possible setting of a detection threshold for eliminating the influence of ambient noise and detecting a modulation generated by a transponder.

FIG. 1 is a schematic example of an electronic radiofrequency identification system, or RFID system, comprising in particular a radiofrequency reader 10 and an associated antenna 20. This antenna 20 is a large volume antenna (a representative volume is for example of the order of 1.2× 2.4×2 $m^3$) essentially formed of a frame and a solenoid formed around the frame. Radiofrequency reader 10 is electrically connected to antenna 20 so that the latter generates an electromagnetic interrogation field essentially confined in the volume defined by the frame of antenna 20 and through which the various transponders to be identified (not shown here) are brought. Ideally, one should try to use an antenna whose constitution and geometry is such that the distribution of the electromagnetic field is essentially uniform in the communication volume defined by the antenna.

According to a preferred embodiment of the invention, the frame of antenna 20 carries (permanently in this example) a reference transponder 30 (or spy transponder) whose identity is known and whose constitution has similar characteristics to the characteristics of the transponders to be identified, i.e. a transponder which, when interrogated, generates a known response whose characteristics (particularly in terms of modulation amplitude) are similar or identical to the characteristics of the response produced by the transponders used in the logistics environment where the identification system is implanted. We will return to the use of reference transponder 30 in more detail hereinafter. It will also be mentioned, that by way of alternative to permanent installation of reference transponder 30 on antenna 20, the reference transponder could be periodically brought into the communication volume of the antenna, for example before each arrival of a group of transponders to be identified.

FIG. 2 illustrates in more detail the operational architecture of radiofrequency reader 10 of FIG. 1. This reader 10 thus typically includes clock means 11 for delivering a clock signal for clocking the modulation and demodulation operations of the transmitted and received electromagnetic signals, a modulation circuit 12 for generating adequate modulation of the electromagnetic field as a function of the data to be transmitted, an amplification and control circuit 13 for driving antenna 20, a demodulation circuit 14 for demodulating the modulated responses transmitted by the transponders and picked up by antenna 20, an amplification and filtering circuit 15 for the signals produced at the output of demodulation circuit 14 and finally a decoding circuit 16 for the demodulated, amplified and filtered signals.

We will not dwell here on the detailed structure of radiofrequency reader 10. It will simply be mentioned that this reader typically has various setting parameters on which it is possible to act in order to affect the transmission and reception characteristics of the reader and on the reader's modulation detection function. In particular, decoding circuit 16 has a setting parameter for affecting the decoding of the received signals. In this case it is a modulation detection threshold (designated DET) for detecting changes in the state of a received signal in order to decode its meaning and extract the transmitted data. This modulation detection threshold DET constitutes a setting parameter that is typically present and required during decoding of the received signals, whatever the type of modulation (amplitude modulation, phase modulation, frequency modulation . . . ) used.

It will be noted that it is also possible to affect the transmission characteristics of the reader, i.e. particularly the amplitude of the electromagnetic field produced, by playing with the setting parameters of amplification and control circuit 13 of the antenna, namely a transmission gain, designated $G_{Tx}$, of amplification circuit 13. The same is true of the reception characteristics of the reader by playing with the setting parameters of amplification and filtering circuit 15, namely a reception gain, designated $G_{Rx}$, of circuit 15, or the filtering parameters of the filters used.

In the aforementioned identification system, it is thus possible to adjust the detection, transmission and/or reception parameters of the radiofrequency reader as a function of ambient electromagnetic noise. In particular, the adjustment process consists first of all of measuring the ambient electromagnetic noise level (without any transponder in the electromagnetic field of the antenna being activated) by means of the reader, followed by an adjustment of the adjustment parameters of the reader as a function of the measured ambient electromagnetic noise level. Preferably, this adjustment step consists in adjusting the reader's modulation detection threshold (or more exactly the modulation detection threshold DET of decoding circuit 16 of FIG. 2) to make it higher than the mean measured ambient electromagnetic noise level.

Measurement of the ambient electromagnetic noise level may simply consist of sampling the signal picked up by the antenna, during a determined period of time in which there are no transponders modulating the electromagnetic field generated by the antenna. This sampling particularly allows one to determine the mean level, the distribution and degree of variability of the ambient electromagnetic noise and thus provides a first measurement of the conditions in which the system has to operate. In particular, as already mentioned, this sampling allows the level of the reader's modulation detection threshold level to be fixed, so that the reader has a high level of insensitivity to ambient electromagnetic noise.

In the preferred case of the addition of the aforementioned reference transponder (element 30 in FIG. 1), a measurement is also then made of the level of response generated by the reference transponder following interrogation by the reader. Given that the transponder response level depends on the characteristics of the transponder (which are also representative of the characteristics of the transponders used with the identification system), this measurement allows, on the one hand, a verification that the system can operate properly taking account of the ambient electromagnetic noise level and the required setting of modulation detection threshold DET and, on the other hand, identifies any necessity of adjusting the transmission and/or reception parameters of the radiofrequency reader (namely, in particular, acting on gains $G_{Tx}$, $G_{Rx}$ of the amplification circuits of the radiofrequency reader).

The purpose of the measurements taken hereinbefore is thus to adjust, as well as possible, the setting parameters of the radiofrequency reader so that the subsequent exchanges with the transponders to be identified occurs in an optimum manner. In extreme cases, these measurements allow, if necessary, to prevent subsequent operation of the reader, to defer execution and/or to warn the operator (for example if the measure of the level of the response of the reference transponder shows that the level of the ambient electromagnetic noise and/or the modulation detection threshold is too high to allow proper operation of the identification system).

FIG. 3 better illustrates the implementation principle of the present invention. Curve "a" in the diagram of FIG. 3 shows, over a determined period of time, a representative evolution of ambient electromagnetic noise over time. Horizontal curve "b" illustrates a possible setting of the aforementioned modulation detection threshold DET. It is clear that several settings are possible. One possible setting could for example consist in an adjustment of the modulation detection threshold such that the latter is higher, by a determined factor, than the mean level of ambient electromagnetic noise or, alternatively, higher than the maximum level of ambient electromagnetic noise. Adjustment of the modulation detection threshold to the lowest possible level is preferable. It is however, clear that the lower this threshold, the more sensitive the reader is to the ambient electromagnetic noise and, conversely, the higher this threshold, the more it will be necessary to increase the transmission and/or reception power of the reader (particularly via an increase in the reader transmission gain $G_{Tx}$).

With reference to FIG. 3, it will be noted finally that curve "c" is representative of a modulation generated by a transponder (for example the reference transponder of FIG. 1) and picked up by the antenna, and that the amplitude level of this modulation (or more exactly, the maximum level of the received signal) has to be sufficiently higher than modulation detection threshold DET so that decoding of the transmitted data can be carried out in the best possible manner. It will be understood that an increase in the transmission gain of the radiofrequency reader allows the signal-to-noise ratio of the received signal to be increased. In addition to the level of the received signal, a modification to the reception gain also affects the ambient electromagnetic noise level and thus may again necessitate a modification to the level of the modulation detection threshold DET.

It will also be noted that adjustment of the parameters of the radiofrequency reader can be carried out with a certain degree of freedom within an adjustment range essentially determined by the electric characteristics of the reader's components. It will be understood, in particular, that saturation of the amplification circuits limits the possibility of adjusting the transmission and reception gains of the radiofrequency reader.

The process of adjusting the various setting parameters of the reader can thus be repeated several times to refine and optimise operation of the reader. The aforementioned measurement and adjustment steps are thus preferably repeated iteratively to achieve an optimum result.

Alternatively, several setting to the detection, transmission and/or reception parameters of the radiofrequency reader can be pre-established and selected as a function of the measured level of ambient electromagnetic noise and, if appropriate, of the measured response of the reference transponder.

It will be understood finally that various modifications and/or improvements obvious to those skilled in the art can be made to the embodiments described in the present description without departing from the scope of the invention defined by the annexed claims. In particular, as already mentioned, the reference transponder preferably used to calibrate the transmission and/or reception gains of the reader might, as an alternative to a permanent arrangement in the interrogation field of the antenna, be placed in the antenna field only each time an adjustment has to be made to the system.

What is claimed is:

1. In an electronic radiofrequency identification system including at least one radiofrequency reader and an antenna associated with said radiofrequency reader for generating an interrogation field through which transponders to be identified pass, a method for adjusting detection, transmission and/or reception parameters of said radiofrequency reader as a function of ambient electromagnetic noise, wherein the method includes at least:
a step of measuring a level of ambient electromagnetic noise by means of the radiofrequency reader;
a step of measuring, by means of the radiofrequency reader, a response of a reference transponder placed, at least temporarily, in the interrogation field of the antenna associated with the radiofrequency reader, said reference transponder having similar characteristics to the characteristics of the transponders to be identified; and
a step of adjusting said detection, transmission and/or reception parameters of the radiofrequency reader on the basis of the measured level of ambient electromagnetic noise and the measured response of the reference transponder.

2. The method according to claim 1, wherein said reference transponder is permanently placed in the interrogation field of the antenna of the radiofrequency reader.

3. The method according to claim 1, wherein said reference transponder is placed in the interrogation field of the antenna of the radiofrequency reader before each adjustment of the transmission and/or reception parameters of the radiofrequency reader.

4. The method according to claim 1, wherein said detection, transmission and/or reception parameters of the radiofrequency reader include in particular a modulation detection threshold, said modulation detection threshold being adjusted during said adjustment step to make it higher than the mean measured level of ambient electromagnetic noise and such that detection of the response transmitted by said reference transponder is essentially insensitive to the ambient electromagnetic noise.

5. The method according to claim 4, wherein said detection, transmission and/or reception parameters of the radiofrequency reader further include a transmission or reception gain of the radiofrequency reader.

6. The method according to claim 1, wherein said measurement and adjustment steps are repeated iteratively to achieve an optimum result.

7. The method according to claim 1, wherein several settings of the detection, transmission and/or reception parameters of the radiofrequency reader are pre-established and wherein said adjustment step consists in a selection of one of said pre-established settings as a function of the measured level of ambient electromagnetic noise and the measured response of said reference transponder.

8. The method according to claim 5, including a chronological sequence of the following steps:
   a) measurement of the level of ambient electromagnetic noise;
   b) adjustment of the modulation detection threshold of the radiofrequency reader on the basis of the measured ambient electromagnetic noise level;
   c) activation of the reference transponder so that it temporarily and continuously transmits a response;
   d) measurement of the level of the response transmitted by the reference transponder; and
   e) adjustment of the transmission and/or reception gains of the radiofrequency reader as a function of the measured level of the response of the reference transponder.

* * * * *